United States Patent
Vargantwar

(10) Patent No.: US 8,964,577 B1
(45) Date of Patent: Feb. 24, 2015

(54) METHOD AND SYSTEM FOR INDICATING A NUMBER OF PAGE MESSAGES IN A SUBSEQUENT PAGE MESSAGE TRANSMISSION PERIOD

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1015 days.

(21) Appl. No.: 12/777,899

(22) Filed: May 11, 2010

(51) Int. Cl.
*H04W 68/02* (2009.01)

(52) U.S. Cl.
USPC ......... 370/252; 370/311; 455/426.1; 455/458

(58) Field of Classification Search
USPC ......... 370/252, 253, 255, 310, 311, 337, 347, 370/508, 510, 514, 515; 455/412.2, 426.1, 455/458, 466, 515, 574
See application file for complete search history.

(56) References Cited

U.S. PATENT DOCUMENTS

| | | | |
|---|---|---|---|
| 5,521,925 A * | 5/1996 | Merakos et al. | 370/337 |
| 6,781,999 B2 | 8/2004 | Eyuboglu et al. | |
| 8,077,650 B2 * | 12/2011 | Santhanam | 370/312 |
| 8,611,898 B2 * | 12/2013 | Song et al. | 455/435.1 |
| 2005/0064880 A1 | 3/2005 | Butler et al. | |
| 2007/0015523 A1 | 1/2007 | Prakash et al. | |
| 2008/0182595 A1 * | 7/2008 | Willey | 455/458 |
| 2010/0034177 A1 * | 2/2010 | Santhanam | 370/338 |

OTHER PUBLICATIONS

3rd Generation Partnership Project, "cdma2000 High Rate Packet Data Air Interface Specification," 3GPP2 C.S0024-B, Sep. 2009.
U.S. Appl. No. 12/564,213, filed Sep. 22, 2009.

\* cited by examiner

*Primary Examiner* — Yemane Mesfin
*Assistant Examiner* — Mon Cheri Davenport

(57) ABSTRACT

A radio access network (RAN) schedules at least one page message for transmission during a page message transmission period of a synchronous capsule. The at least one page message includes a first number (zero or more) of first-priority page messages followed by a second number (zero or more) of second-priority page messages. The RAN transmits an indication of the first number prior to the page message transmission period. The indication of the first number may be reflected in a time offset between a beginning of the synchronous capsule and a beginning of a predefined time slot, or the indication of the first number may be included in an overhead message in the synchronous capsule. A wireless device that is configured to receive first-priority page messages determines whether to monitor the page message transmission period, and how many page messages to receive, based on the indication of the first number.

11 Claims, 4 Drawing Sheets

METHOD AND SYSTEM FOR INDICATING A NUMBER OF PAGE MESSAGES IN A SUBSEQUENT PAGE MESSAGE TRANSMISSION PERIOD

BACKGROUND

In wireless telecommunication networks, such as cellular wireless networks, a radio access network (RAN) may transmit messages to mobile devices that are in an idle state, i.e., mobile devices that are not engaged in any communication sessions. Such messages may include, for example, overhead messages that convey configuration parameters or system-related information, and page messages that direct specific mobile devices to contact the RAN (e.g., in relation to incoming calls).

In order to save power, a mobile device in an idle state may operate primarily in a low-power, sleep mode. In sleep mode, the mobile device's transceiver may be powered down so that the mobile device does not receive transmissions from the RAN. However, at certain times, the mobile device may "wake up" from the sleep mode and monitor a designated channel for transmissions from the RAN. For example, a mobile device may operate in a slotted mode in which the mobile device wakes up periodically (e.g., during specified time slots) to monitor transmissions from the RAN in a paging channel or control channel.

How frequently a mobile device wakes up from sleep mode to monitor transmissions from the RAN may depend on the type of communication sessions that the mobile device supports. For communication sessions that are highly sensitive to latency, such as push-to-talk (PTT) communication sessions, a mobile device may wake up from sleep mode very frequently. For communication sessions that are less sensitive to latency, such as conventional voice calls, a mobile device may wake up less frequently.

A recent standard for Evolution Data-Optimized (EVDO) spread spectrum communications, $3^{rd}$ Generation Partnership Project, "cdma2000 High Rate Packet Data Air Interface Specification," 3GPP2 C.S0024-B, September 2009, describes a "Sleep State," in which a mobile device may shut down processing resources to reduce power consumption, and a "Monitor State," in which a mobile device monitors a control channel to receive overhead messages and to listen for page messages.

To listen for page messages while in the Monitor State, the mobile device may receive a synchronous sleep state capsule that the RAN transmits on the control channel. Each synchronous sleep state capsule includes a QuickConfig message (an overhead message) and zero or more page messages. When a mobile device receives a synchronous sleep state capsule, the mobile device receives the QuickConfig message and any page messages contained in the capsule. The page messages may include one or more page messages intended for that mobile device and/or one or more page messages intended for other mobile devices. Once the mobile device has received the entire synchronous sleep state capsule (the last packet in the synchronous sleep state capsule is marked with a SleepState-CapsuleDone flag), the mobile device may return to the Sleep State.

OVERVIEW

In a first principal aspect, an exemplary embodiment provides a method for a radio access network (RAN). The RAN determines a message sequence to be transmitted in a control signal. The RAN selects a time offset based on the message sequence. The RAN transmits the control signal with the time offset.

In a second principal aspect, an exemplary embodiment provides a method for a radio access network (RAN). The RAN schedules at least one page message for transmission during a page message transmission period. The RAN identifies a first number of first-priority page messages in the at least one page message. The first number is zero or greater. The first-priority page messages relate to first-priority communication sessions. Prior to the page message transmission period, the RAN transmits an indication of the first number. The RAN transmits the at least one page message during the page message transmission period.

In a third principal aspect, an exemplary embodiment provides a method for a wireless device that is being served by a radio access network (RAN). The RAN is configured to transmit page messages during page message transmission periods, the page messages including first-priority page messages relating to first-priority communication sessions and second-priority page messages relating to second-priority communication sessions. The wireless device receives a signal from the RAN and determines from the signal whether any first-priority page messages are scheduled for transmission during a subsequent page message transmission period.

DETAILED DESCRIPTION OF EXEMPLARY EMBODIMENTS

1. Introduction

Figure 1:
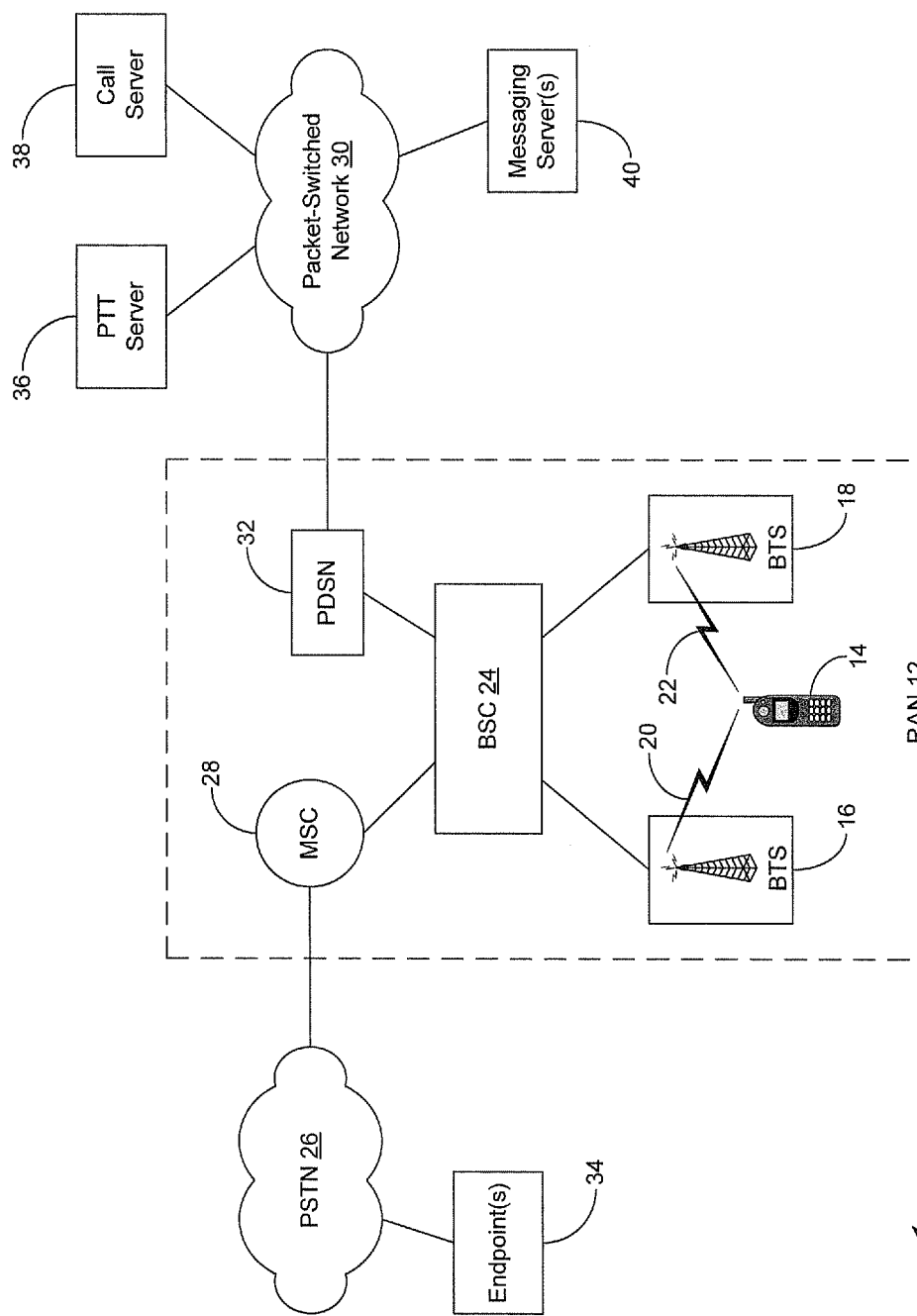
FIG. 1 is a block diagram of a wireless telecommunications network, in accordance with an exemplary embodiment.

The inventor has recognized that the conventional approach in which a wireless device monitors an entire page transmission period (e.g., in a synchronous sleep state capsule) in order to listen for page messages relating to a certain type of communication session can lead to inefficiencies because some or all of the page messages may relate to other types of communication sessions. For example, a wireless device may wake up very frequently in order to listen for page messages that relate to communication sessions that are highly sensitive to latency, such as push-to-talk (PTT) communication sessions. But the page messages that are transmitted during a given page message transmission period could all relate to communication sessions that are less sensitive to latency. In that case, monitoring the page message transmission period for page messages that relate to PTT sessions, when there are none, would be an inefficient use of battery power.

Wireless devices that support both PTT communication sessions and other types of communication sessions (such as conventional voice calls) may be subject to additional difficulties. For example, a wireless device may monitor a first channel for page messages relating to PTT sessions and a second channel for page messages relating to conventional voice calls. In that case, the wireless device may miss a page message transmitted on the second channel because the wireless device is busy receiving page messages transmitted on the first channel.

Accordingly, the inventor proposes methods and systems that enable a wireless device to listen to page messages more efficiently. In an exemplary approach, a radio access network (RAN) transmits an indication of a number of page messages that are scheduled for transmission during a subsequent page message transmission period. The indicated number could be the total number page messages scheduled for transmission, or the indicated number could be the number of page messages of a particular type that are scheduled for transmission.

For example, the RAN may distinguish between page messages that relate to latency-sensitive communication sessions (such as PTT communication sessions) and page messages that relate to other types of communication sessions (such as conventional voice calls). The RAN may treat page messages that relate to latency-sensitive communication sessions as first-priority page messages and page messages that relate to other types of communications sessions as second-priority page messages. Further, the RAN may schedule page messages for transmission during a page message transmission period such that first-priority page message are transmitted first and second-priority page messages are transmitted thereafter. Prior to the page transmission period, the RAN may transmit an indication of the number of first-priority page messages that are scheduled for transmission during the page message transmission period.

A wireless device that wakes up from a sleep mode to listen for page messages that relate to first-priority communication sessions (e.g., PTT communication sessions) may receive the RAN's indication of the number of first-priority page messages scheduled for transmission during the page message transmission period. The wireless device may use the indicated number to determine whether to monitor the page message transmission period and, if so, how many page messages to receive. If the indicated number is zero, indicating that no first-priority page messages will be transmitted, then the wireless device may go back into sleep mode instead of monitoring the page message transmission period. If the indicated number is a non-zero number, N, then the wireless device may receive the first N page messages that are transmitted during the page message transmission period and then go back into sleep mode. Thus, the wireless device may receive only the first-priority page messages, which the RAN transmits first, rather all of the page messages transmitted during a page message transmission period. In this way, a wireless device may use the number indicated by the RAN to monitor a page message transmission period more efficiently.

The RAN may transmit an indication of the number of page messages or first-priority page messages in various ways. In one approach, the RAN may transmit an overhead message (such as a QuickConfig message) prior to the page message transmission period. The number of page messages and/or first-priority page messages may be included in one or more designated fields of the overhead message. Thus, the overhead message might include the number of first-priority page messages that are scheduled for transmission in the next page message transmission period and/or the total number of page messages that are scheduled for transmission during the period.

In another approach, the RAN may transmit the page messages in a synchronous communication (e.g., a sleep state synchronous capsule) that is synchronized with the RAN's system time. The RAN may transmit the synchronous communication with a time offset relative to the beginning of a designated time slot such that the time offset indicates the number. For example, the synchronous communication may be a signal that is spread with a pseudonoise (PN) code having a chip rate. The time offset may then correspond to an integral number of chips, such that the integral number of chips in the time offset is related to the number of page messages or first-priority page messages that are being transmitted in the synchronous communication.

Thus, a RAN may provide an indication of the number of page messages that are scheduled for transmission during a subsequent page message transmission period, or an indication of the number of page messages of a certain type (e.g., the number of page messages that relate to PTT communication sessions). A wireless device may use the indication to determine whether to monitor the page message transmission period and, if so, many page messages to receive.

These approaches may beneficially enable the wireless device to spend more time in sleep mode, thereby improving battery life. In addition, the possibility of the wireless device missing a page message transmitted on one channel while receiving page messages on another channel may be reduced.

2. Exemplary Wireless Telecommunications Network

FIG. 1 is a block diagram of a wireless telecommunications network 10 in which exemplary embodiments may be employed. Wireless telecommunications network 10 includes a radio access network (RAN) 12 that can wirelessly communicate with wireless devices, such as wireless device 14. Wireless device 14 could be, for example, a wireless telephone, wireless personal digital assistant, wirelessly-equipped notebook or handheld computer, or other type of wireless communication device.

To support wireless communication with wireless devices, such as wireless device 14, RAN 12 may include one or more wireless access points, such as base transceiver stations (BTSs), exemplified in FIG. 1 by BTS 16 and BTS 18. Each of BTSs 16 and 18 has a wireless coverage area (e.g., a cell or one or more sectors) within which it can wirelessly communicate with wireless devices. The wireless coverage areas provided by BTS 16 and BTS 18 could be overlapping. Thus, wireless device 14 may communicate with BTS 16 over an air interface 20 and with BTS 18 over an air interface 22. The wireless communications over air interface 20 and 22 may be in accordance with a protocol such as 1xRTT CDMA, EVDO, GSM, WiMAX (IEEE 802.16), WiFi (IEEE 802.11), UMTS, LTE, or other wireless communication protocol.

In an exemplary embodiment, 1xRTT CDMA is used for air interface 20 and EVDO is used for air interface 22. Thus, wireless device 14 may periodically monitor air interface 20 for page messages transmitted by BTS 16 over a 1xRTT channel, and wireless device 14 may periodically monitor air interface 22 for page messages transmitted by BTS 18 over an EVDO channel. Alternatively, a BTS may provide both a 1xRTT CDMA air interface and an EVDO air interface. Thus, to listen for page messages, wireless device 14 may periodically monitor a 1xRTT channel and an EVDO channel transmitted by the same BTS (e.g., BTS 18).

Although FIG. 1 shows RAN 12 with BTSs 16 and 18, it is to be understood that RAN 12 may include a greater or fewer number of wireless access points. RAN 12 may also include a controller, such as base station controller (BSC) 24, that controls wireless access points, such as BTSs 16 and 18. Alternatively, BTSs 16 and 18 could be controlled by different BSCs.

BSC 24 may be communicatively coupled to a circuit-switched network (PSTN 26) via a mobile switching center (MSC) 28 and/or to a packet-switched network 30 via a packet data serving node (PDSN) 32. It is to be understood, however, that the arrangement of RAN 12, PSTN 26, and packet-switched network 30, shown in FIG. 1 are exemplary only, as RAN 12 could be communicatively coupled to other types of networks and/or could be configured in other ways.

With the configuration of RAN 12 shown in FIG. 1, wireless device 14 may engage in communication sessions with one or more endpoints via PSTN 26 and/or one or more endpoints via packet-switched network 30. Such communication sessions may involve wireless device 14 sending and/or receiving voice, text, data, video, and/or other media.

In an exemplary embodiment, wireless device 14 uses different air interfaces for different types of communication sessions. For example, wireless device 14 may engage in voice calls or exchange text with one or more endpoints(s) 34 via PSTN 26. Endpoint(s) 34 may include, for example, landline stations and/or mobile stations. For such communications carried over PSTN 26, wireless device 14 may use a 1xRTT CDMA air interface, such as air interface 20. Wireless device 14 may also be able to engage in voice-over-Internet-Protocol (VoIP) communication via packet-switched network 30. In addition to VoIP communications, wireless device 14 may be able to send/and or receive text messages, instant messages, e-mail messages, multi-media messages, Web content, streaming video, and/or other media via packet-switched network 30. For such communications carried over packet-switched network 30, wireless device 14 may use an EVDO air interface, such as air interface 22.

In an exemplary embodiment, wireless device 14 is able to engage in different types of VoIP communication sessions. For example, wireless device 14 may be able to engage in push-to-talk (PTT) communication sessions via a PTT server 36. Such PTT communications may be half-duplex communications that provide the user with a walkie-talkie type experience. In a PTT communication session, a voice communication from an initiator may be played out through a recipient's communication device, without first alerting the recipient and waiting for the recipient to answer. Wireless device 14 may also be able to engage in conventional VoIP communication sessions via a call server 38. Such conventional VoIP communication sessions may provide the user with an experience that is similar to that of a conventional voice call, including full-duplex communication and user-discernible alerting of an incoming call that gives the user the choice of either accepting or declining the call.

These different types of VoIP communication may be associated with different latency characteristics. For example, PTT communications may be established with minimal latency in order to provide an experience that a user may regard as nearly "instant" communication. In contrast, conventional VoIP communications are less sensitive to latency because the user is alerted of an incoming call and has an opportunity to either answer or ignore it. Other types of communications carried over packet-switched network 30, such as e-mail messages, text messages, or multi-media messages, may also be relatively insensitive to latency. Wireless device 14 may receive such messages from one or more messaging server(s) 40.

Because of the different latency characteristics of different types of communication sessions, wireless device 14 may listen for page messages for different types of communication sessions at different monitoring frequencies. For example, wireless device 14 may monitor EVDO air interface 22 for page messages relating to PTT sessions at a high monitoring frequency and may monitor EVDO air interface 22 for page messages relating to other types of communication sessions at a low monitoring frequency. In addition, wireless device 14 may monitor 1 xRTT CDMA air interface 20 for page messages relating to conventional voice calls or text messages at a low monitoring frequency.

The different monitoring frequencies used by wireless device 14 could be defined by different slot cycle indexes or in other ways. In an exemplary embodiment, wireless device 14 monitors a control channel of EVDO air interface 22. In the EVDO approach, the control channel is divided into contiguous time slots, each having a duration of about 1.67 ms. A sequence of 256 consecutive time slots defines a control channel cycle, and each control channel cycle may include one or more page message transmission periods (e.g., as part of a synchronous sleep state capsule or sub-synchronous capsule). To listen for page messages that relate to PTT sessions, wireless device 14 may wake up once at least once every control channel cycle. However, wireless device 14 may listen for page messages relating to other types of communication sessions less frequently, such as once every j control channel cycles, where j is an integer greater than one.

As described in more detail below, when wireless device 14 wakes up in a control channel cycle to listen for page messages that relate only to first-priority communication sessions (e.g., PTT sessions), wireless device 14 may receive from RAN 12 an indication of the number of first-priority page messages that are scheduled for transmission during the page message transmission period of that control channel cycle. Wireless device 14 may then use the indicated number to determine whether to monitor the page message transmission period and, if so, how many page messages to receive.

3. Exemplary Method

Figure 2:
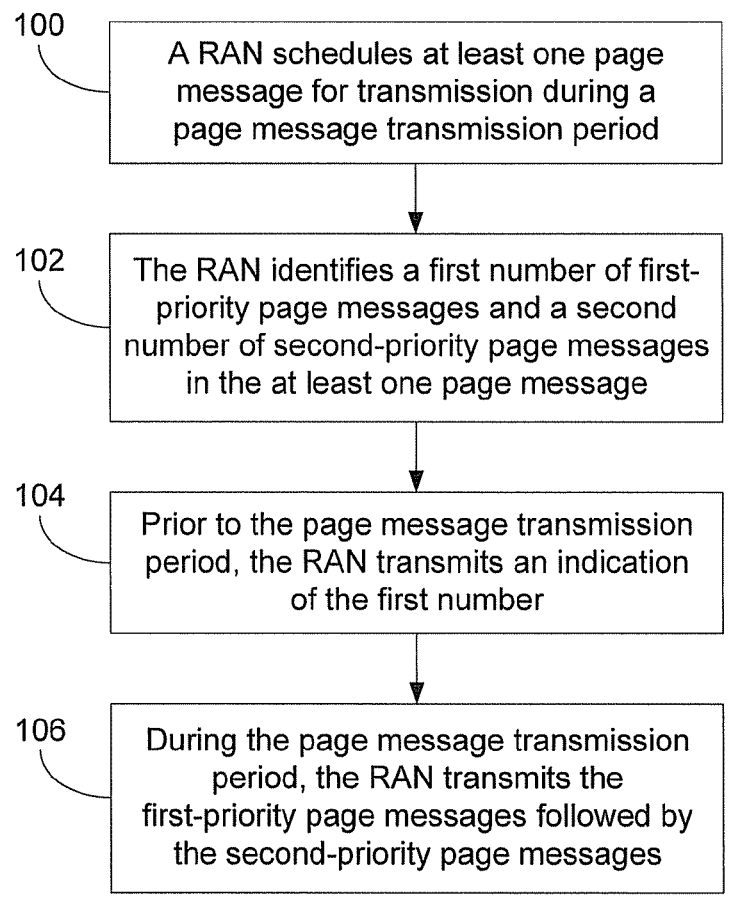
FIG. 2 is flow chart illustrating a method for a radio access network (RAN), in accordance with an exemplary embodiment.

FIG. 2 is a flow chart illustrating an exemplary method for a RAN. For purposes of illustration, FIG. 2 is described with reference to the configuration of wireless telecommunications network 10 shown in FIG. 1. It is to be understood, however, that other configurations could be used. Further, FIG. 2 is described with reference to an EVDO air interface for purposes of illustration. It is to be understood, however, that other types of air interface could be used.

The method begins when a RAN (e.g., RAN 12) schedules at least one page message for transmission during the page message transmission period, as indicated by block 100. The at least one page message may relate to communication sessions that are requested by endpoints(s) 34 that use PSTN 26 and/or requested by servers that use packet-switched network 30, such as PTT server 36, call server 38, or messaging server(s) 40. For example, the RAN may receive a request, such as a Session Initiation Protocol (SIP) INVITE message, from PTT server 36, call server 38, or a messaging server 40, to establish a communication session with a particular wireless device (e.g., wireless device 14). In response, the RAN may schedule a page message that directs the particular wireless device to contact the RAN regarding the requested communication session.

Figure 3:
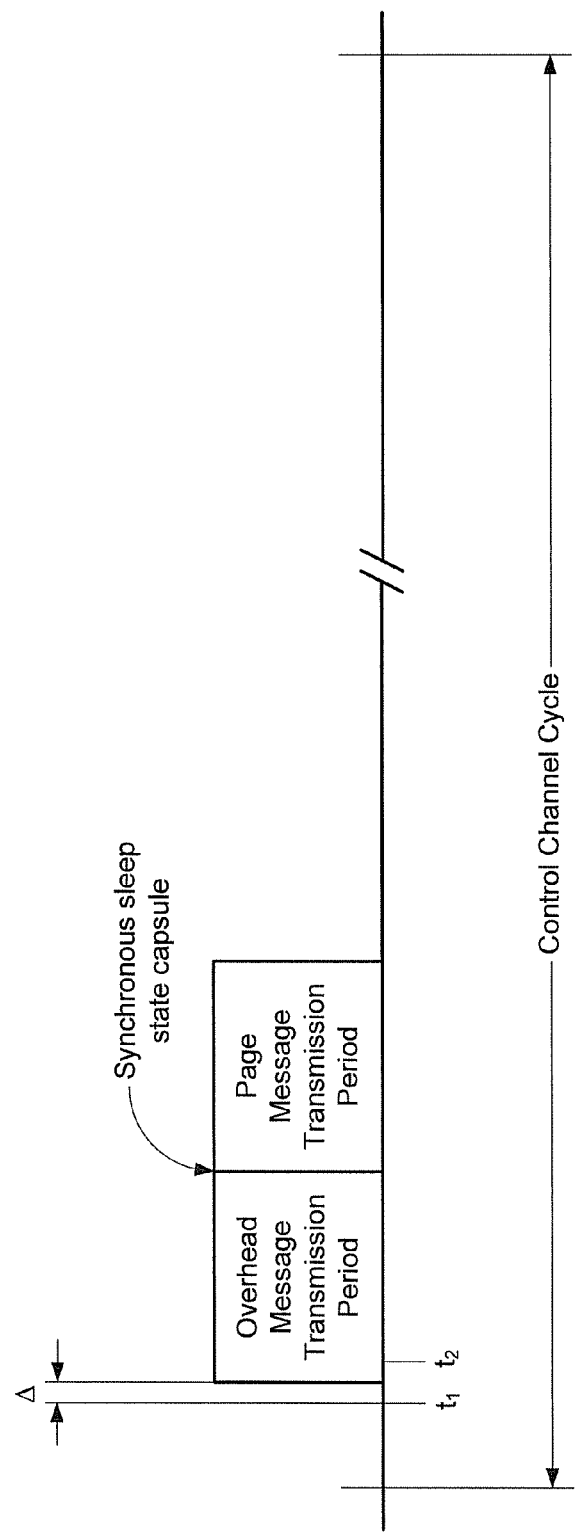
FIG. 3 is a timing diagram of a synchronous sleep state capsule, in accordance with an exemplary embodiment.

The page message transmission period may be a time period that is monitored by one or more wireless devices being served by the RAN. For example, the page message transmission period could correspond to one or more time slots that are monitored by particular wireless devices in accordance with a slot cycle index or other type of monitoring schedule. In the case of an EVDO air interface (e.g., air interface 22), the page message transmission may be in a synchronous sleep state capsule that the RAN transmits over a control channel. As illustrated in FIG. 3, the synchronous sleep state capsule may begin in a specified time slot of a control channel cycle and may include an overhead message transmission period followed by a page message transmission period. The RAN may schedule one or more overhead messages (such as a QuickConfig message) for transmission during the overhead message transmission period and may schedule one or more page messages for transmission during the page message transmission period of the synchronous sleep state capsule.

The RAN may distinguish between different types of page messages in the at least one page message scheduled for transmission during the page message transmission period, based on priority and/or other criteria. In an exemplary embodiment, the RAN identifies a first number (zero or more) of first-priority page messages and a second number (zero or more) of second-priority page messages in the at least one page message, as indicated by block 102.

To distinguish between first-priority and second-priority page messages, the RAN may take into account the network element that requested the communication session, the intended recipient of the page message, the type of communication session being requested, and/or other information. For example, the RAN may regard requests from PTT server 36 as relating to first-priority communication sessions (e.g., because PTT sessions are highly sensitive to latency). Thus, the RAN may identify page messages that relate to communication sessions requested by PTT server 36 as first-priority page messages. The RAN may identify page messages that relate to requests from other network elements, such as call server 38 and messaging server(s) 40, as being second-priority page messages.

Alternatively, the RAN may determine the type of communication session being requested by parsing the request message itself. For example, the RAN may receive a SIP INVITE message and determine, from a session description contained in the message, whether a PTT communication session or other type of communication session is being requested. The RAN may then identify page messages relating to PTT communication sessions as first-priority page messages and may identify page messages relating to other types of communication sessions as second-priority page messages.

Prior to the page message transmission period, the RAN transmits an indication of the first number, as indicated by block 104. The RAN may provide this indication in various ways. In one approach, the RAN transmits an overhead message that indicates the first number. For example, if the page message transmission period is part of a synchronous sleep state capsule, as shown in FIG. 3, the RAN may include the first number in a QuickConfig message that the RAN transmits in an overhead message transmission period preceding the page message transmission period.

In an alternative approach, the RAN transmits a synchronous sleep state capsule with a time offset that indicates the first number. As illustrated in FIG. 3, the RAN may begin the transmission of the synchronous sleep state capsule in a specified time slot of a control channel cycle. The time slot extends from time, $t_1$, to time, $t_2$, and has a duration of about 1.67 ms. However, the beginning of the synchronous sleep state capsule may be offset from the beginning of the time slot, $t_1$, by an amount, $\Delta$. The RAN may use the value of $\Delta$ to indicate the first number. For example, if the RAN has scheduled N first-priority page messages for transmission during the page message transmission period of the synchronous sleep state capsule, then RAN may select $\Delta$ using the relationship $\Delta=N\times T$, where T is a predetermined period of time. In an exemplary embodiment, T is equal to one chip in the PN code that the RAN uses to spread the signals it transmits on the control channel.

During the page message transmission period, the RAN transmits the first-priority page messages followed by the second-priority page messages, as indicated by block 106. In this way, a wireless device that is listening for only first-priority page messages may receive an indication from the RAN that N first-priority page messages (where N is zero or more) are scheduled for transmission during the next page message transmission period. The wireless device is then able to receive all of the first-priority page messages in the page message transmission period by receiving just the first N page messages.

Figure 4:
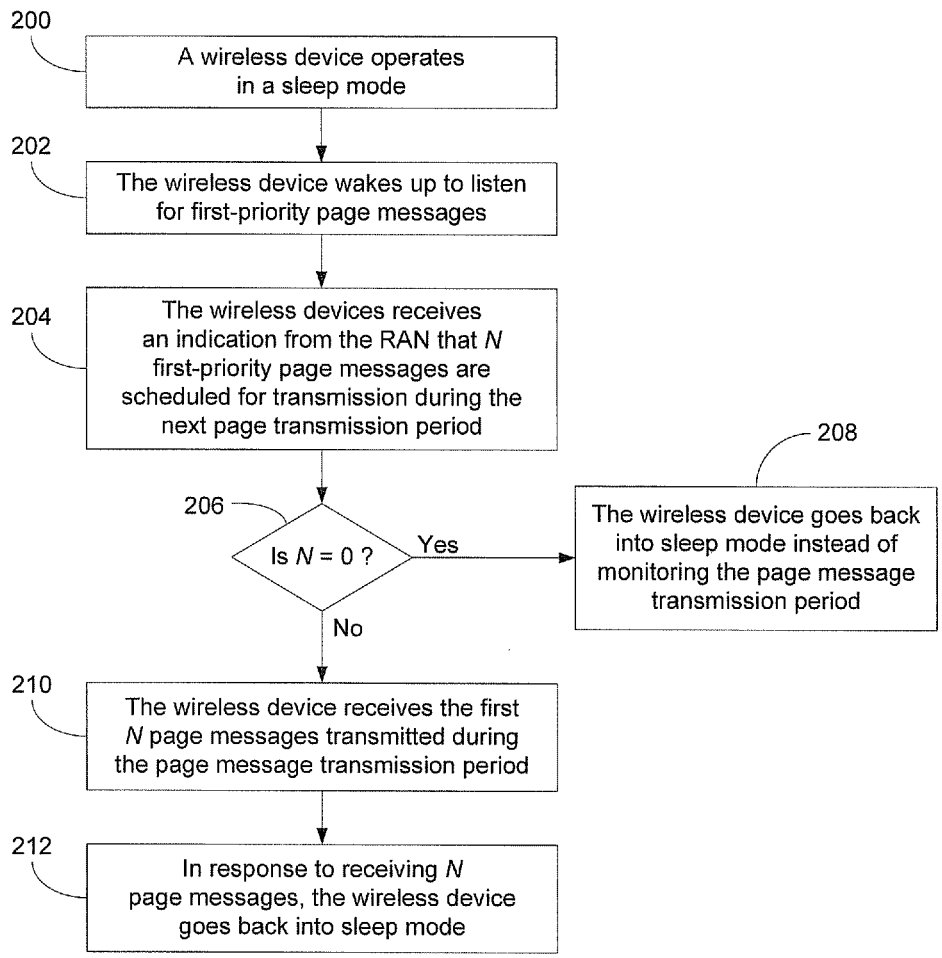
FIG. 4 is flow chart illustrating a method for a wireless device, in accordance with an exemplary embodiment.

FIG. 4 is a flow chart illustrating an exemplary method for a wireless device. The method begins with a wireless device operating in a sleep mode, as indicated by block 200. The sleep mode could be a low-power mode in which the wireless device powers down its transceiver and limits other functions in order to extend battery life.

At some point, the wireless device wakes up to listen for first-priority page messages, as indicated by block 202. For example, wireless device 14 may wake up to listen for page messages transmitted by BTS 18 over a control channel of EVDO air interface 22. Although in this example the wireless device wakes up to listen for first-priority page messages (e.g., page messages that relate to PTT communication sessions), it is to be understood that the wireless device may listen for second-priority page messages at other times (e.g., during a subsequent control channel cycle of EVDO air interface 22) and/or by monitoring other channels (e.g., by monitoring a control channel of 1xRTT air interface 20).

After the wireless device wakes up, the wireless device receives an indication from the RAN that N first-priority page messages are scheduled for transmission during the next page message transmission period, as indicated by block 204. In the case of an EVDO air interface, the wireless device may receive the indication by receiving at least part of a synchronous sleep state capsule transmitted by the RAN. For example, a time offset of the synchronous sleep state capsule may indicate N, or N may be included in a QuickConfig message in the synchronous sleep state capsule. Alternatively, the wireless device may receive the indication from the RAN in other ways.

Whether the wireless device monitors the subsequent page message transmission period may depend on whether N is equal to zero, as indicated by block 206. If N is zero, indicating that no first-priority page messages are scheduled for transmission during the page message transmission period, then the wireless device may go back into sleep mode instead of monitoring the page message transmission period, as indicated by block 208.

If N is non-zero, then the wireless device may receive the first N page messages transmitted during the page message transmission period, as indicated by block 210. In other words, N may indicate that the first N page messages are the first-priority page messages. In response to receiving N page messages, the wireless device may go back into sleep mode, as indicated by block 212. Thus, even though the RAN may transmit additional page messages (e.g., second-priority page messages) after transmitting the N first-priority page messages, the wireless device may go back into sleep mode to save power instead of receiving the additional page messages.

In this way, a wireless device may beneficially save power by limiting its reception of page messages in a page message transmission period to a specific category of page messages. To facilitate this function, the wireless device may receive an indication of the RAN of the number of page messages in that specific category. As described above with reference to FIGS. 2 and 4, the RAN may categorize page messages based on priority. However, a RAN may categorize page messages in other ways. Thus, a RAN may indicate the number of page messages in a category other than a priority category, such as the number of page messages intended for a certain class of wireless device. In addition, a RAN may divide the page messages into more than two categories. For example, a RAN might identify first-priority, second-priority, and third-priority page messages. In other cases, the number indicated by a RAN may be the total number of page messages, rather than the number of page messages in a particular category.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a radio access network (RAN), comprising:
   said RAN scheduling at least one page message for transmission during a page message transmission period;
   said RAN distinguishing between different types of page messages in said at least one page message based on communication session priority to identify a first number of first-priority page messages in said at least one page message, wherein said first number is zero or greater, wherein said first-priority page messages relate to first-priority communication sessions;
   prior to said page message transmission period, said RAN transmitting an indication of said first number; and
   said RAN transmitting said at least one page message during said page message transmission period.

2. The method of claim 1, further comprising:
   said RAN identifying a second number of second-priority page messages in said at least one page message, wherein said second number is zero or greater, wherein said second-priority page messages relate to second-priority communication sessions.

3. The method of claim 2, wherein said RAN transmitting said at least one page message during said page message transmission period comprises:
   said RAN transmitting said first number of first-priority page messages and subsequently transmitting said second number of second-priority page messages.

4. The method of claim 1, further comprising:
   said RAN transmitting a synchronous communication, said synchronous communication including an overhead message transmission period followed by said page message transmission period, said overhead message transmission period including at least one overhead message, said page message transmission period including said at least one page message.

5. The method of claim 4, wherein said RAN transmitting an indication of said first number comprises:
   said RAN including said first number in said at least one overhead message.

6. The method of claim 4, wherein said RAN transmitting an indication of said first number comprises:
   said RAN transmitting said synchronous communication such that a time offset between a beginning of said synchronous communication and a beginning of a predefined time slot indicates said first number.

7. The method of claim 1, wherein said first-priority communication sessions are push-to-talk (PTT) communication sessions.

8. A method for a wireless device that is being served by a radio access network (RAN), wherein said RAN is configured to transmit page messages during page message transmission periods, said page messages including first-priority page messages relating to first-priority communication sessions and second-priority page messages relating to second-priority communication sessions, said method comprising:
   said wireless device receiving a signal from said RAN; and
   said wireless device determining from said signal whether any first-priority page messages are scheduled for transmission during a subsequent page message transmission period.

9. The method of claim 8, wherein said wireless device determining from said signal whether any first-priority page messages are scheduled for transmission during a subsequent page message transmission period comprises:
   said wireless determining from said signal that N first-priority page messages are scheduled for transmission during said subsequent page message transmission period.

10. The method of claim 9, further comprising:
    if N is zero, said wireless device entering a sleep mode instead of monitoring said subsequent page message transmission period.

11. The method of claim 9, further comprising:
    if N is non-zero, said wireless device entering a sleep mode in response to receiving N page messages transmitted in said subsequent page message transmission period.

* * * * *